United States Patent
Young et al.

(10) Patent No.: US 9,961,326 B2
(45) Date of Patent: May 1, 2018

(54) STEREO EXTENDED DEPTH OF FOCUS

(71) Applicant: KLA-Tencor Corporation, Milpitas, CA (US)

(72) Inventors: Scott Young, Soquel, CA (US); Andy Hill, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 372 days.

(21) Appl. No.: 13/728,014

(22) Filed: Dec. 27, 2012

(65) Prior Publication Data
US 2013/0176402 A1     Jul. 11, 2013

Related U.S. Application Data

(60) Provisional application No. 61/584,435, filed on Jan. 9, 2012.

(51) Int. Cl.
| | | |
|---|---|---|
| *H04N 13/02* | (2006.01) | |
| *G02B 21/22* | (2006.01) | |
| *G02B 27/00* | (2006.01) | |
| *G02B 21/36* | (2006.01) | |
| *G02B 27/22* | (2018.01) | |

(52) U.S. Cl.
CPC ......... *H04N 13/0239* (2013.01); *G02B 21/22* (2013.01); *G02B 27/0075* (2013.01); *G02B 21/364* (2013.01); *G02B 27/22* (2013.01)

(58) Field of Classification Search
CPC .............. A61B 3/1015; G01B 9/02038; H04N 2209/048; H04N 5/2254
USPC ........... 250/201.9; 348/E9.008, E9.006, 262; 351/159.08; 356/486; 382/103; 600/476
See application file for complete search history.

(56) References Cited

U.S. PATENT DOCUMENTS

| | | | | |
|---|---|---|---|---|
| 5,659,420 A | * | 8/1997 | Wakai ................. | G01B 11/026 356/511 |
| 5,847,805 A | * | 12/1998 | Kohayakawa ......... | A61B 3/145 351/210 |
| 6,188,514 B1 | * | 2/2001 | Saito ................... | G02B 21/0052 359/234 |
| 6,351,325 B1 | * | 2/2002 | Mandella ........... | G02B 21/0056 359/210.1 |

(Continued)

FOREIGN PATENT DOCUMENTS

JP     2006-218103     8/2006

OTHER PUBLICATIONS

Edward R. Dowski, Jr., and W. Thomas Cathey, Extended depth of field through wave-front coding, Applied Optics, Apr. 10, 1995, pp. 1859-1866, vol. 34—No. 11, Optical Society of America, United States.

*Primary Examiner* — Deirdre Beasley
(74) *Attorney, Agent, or Firm* — Suiter Swantz pc llo

(57) ABSTRACT

The disclosure is directed to providing high resolution stereoscopy with extended depth of focus. Wave front coding in optical paths going to a first detector and at least a second detector may be implemented to affect an intermediate set of images. The intermediate set of images may be filtered (i.e. decoded) to produce a filtered set of images with selected resolution and depth of focus properties. A first filtered image and a second filtered image may be substantially simultaneously presented to respective first and second eyes of an observer to further generate an illusion of enhanced depth (i.e. 3D perception).

21 Claims, 3 Drawing Sheets

(56) References Cited

U.S. PATENT DOCUMENTS

| | | | |
|---|---|---|---|
| 6,838,650 B1 * | 1/2005 | Toh | G02B 21/0024 250/201.3 |
| 6,873,593 B1 * | 3/2005 | Pavel | B82Y 10/00 369/121 |
| 7,218,448 B1 * | 5/2007 | Cathey, Jr. | G01S 3/7835 359/558 |
| 7,405,877 B1 * | 7/2008 | Schechterman | A61B 1/00096 359/462 |
| 7,732,750 B2 * | 6/2010 | Dowski, Jr. | G01S 3/7835 250/201.9 |
| 7,787,112 B2 * | 8/2010 | Rahn | G01N 21/4795 356/213 |
| 8,179,534 B2 * | 5/2012 | Sesko | G01B 11/026 356/486 |
| 8,348,429 B2 * | 1/2013 | Walsh | A61B 3/102 351/204 |
| 8,558,873 B2 * | 10/2013 | McEldowney | G01B 11/2513 348/46 |
| 2003/0225455 A1 | 12/2003 | Cathey, Jr. | |
| 2005/0036667 A1 * | 2/2005 | So | G06K 9/00127 382/128 |
| 2005/0105044 A1 * | 5/2005 | Warden | A61B 3/1015 351/159.08 |
| 2005/0218124 A1 * | 10/2005 | Jennings | B23K 26/032 219/121.65 |
| 2006/0058682 A1 * | 3/2006 | Miller | A61B 3/102 600/476 |
| 2007/0139657 A1 * | 6/2007 | Ishimaru | G01B 11/2441 356/511 |
| 2008/0019584 A1 * | 1/2008 | Lindberg | G01N 15/1463 382/134 |
| 2008/0037113 A1 * | 2/2008 | Nakamura | G02B 21/0012 359/373 |
| 2008/0137059 A1 | 6/2008 | Piestun et al. | |
| 2009/0086296 A1 * | 4/2009 | Renaud-Goud | G03H 1/2205 359/9 |
| 2009/0135432 A1 * | 5/2009 | Betzig | G01N 21/6445 356/521 |
| 2009/0231278 A1 * | 9/2009 | St. Hilaire | G06F 3/017 345/158 |
| 2010/0097671 A1 * | 4/2010 | Leister | G02B 27/0172 359/9 |
| 2011/0279778 A1 * | 11/2011 | Saito | A61B 3/14 351/221 |
| 2012/0008194 A1 * | 1/2012 | Mizuta | G02B 21/025 359/377 |
| 2012/0044393 A1 * | 2/2012 | Ono | H04N 5/2254 348/265 |
| 2012/0287244 A1 * | 11/2012 | Bennett | G01N 21/6458 348/46 |

* cited by examiner

STEREO EXTENDED DEPTH OF FOCUS

PRIORITY

The present application claims priority to U.S. Provisional Application Ser. No. 61/584,435, entitled STEREO EXTENDED DEPTH OF FOCUS, By Scott Young et al., filed Jan. 9, 2012, which is currently co-pending, or is an application of which a currently co-pending application is entitled to the benefit of the filing date.

TECHNICAL FIELD

The present disclosure generally relates to the field of stereoscopic imaging and more particularly to stereoscopic imaging with extended depth of focus.

BACKGROUND

Stereoscopy is a useful tool for analyzing complex or deep structural attributes of a variety of potential samples, such as tissue specimens, microscopy slides, three dimensional (3D) cell stacks, and the like. Typically, a sample is imaged utilizing two image paths with an angle offset between a first image path and a second image path resulting in two different images of the sample. An illusion of enhanced depth (i.e. 3D perception) is created by separately presenting the first and second images to respective eyes of an observer at the same time.

In some stereoscopy systems, the depth of focus is limited by the numerical aperture (NA) of an objective lens. A high NA is often desired for better image resolution, especially at increased magnification levels. As such, a tradeoff typically exists between image resolution and depth of focus in stereoscopic imaging.

SUMMARY

The present disclosure is directed to providing high resolution stereoscopy with extended depth of focus by wave front coding in optical paths going to a first detector and a second detector to affect an intermediate set of images. By filtering (i.e. decoding) the intermediate images, a set of stereoscopic images with higher resolution and extended depth of focus than would otherwise be possible may be ascertained. The summary and detailed description that follow illustrate stereoscopic imaging systems and methods in accordance with various embodiments of this disclosure.

In one aspect, the present disclosure is directed to a system for stereoscopically imaging at least a portion of one or more samples. The system may include a stage configured to support a sample and an illumination source configured to illuminate at least a portion of the sample. The system may further include collection optics defining a collection path. The collection optics may be configured to receive illumination transmitted through or reflected from a surface of the sample. The collection optics may be further configured to direct a first portion of the illumination along a first imaging path to a first detector and a second portion of the illumination along a second imaging path to a second detector. A wave front coder disposed along the collection path may be configured to induce one or more imaging effects, at least by phase shifting the illumination directed along the collection path. The system may further include at least one computing system communicatively coupled to the first detector and the second detector. The computing system may be configured to acquire a first image from the first detector and a second image from the second detector. The computing system may be further configured to filter the first image and the second image to remove at least a portion of the one or more imaging effects induced by the wave front coder.

In another aspect, the present disclosure is directed to a system for stereoscopically imaging at least a portion of one or more samples. The system may include a stage configured to support a sample and an illumination source configured to illuminate at least a portion of the sample. The system may further include collection optics defining a collection path. The collection optics may be configured to receive illumination transmitted through or reflected from a surface of the sample. The collection optics may be further configured to direct a first portion of the illumination along a first imaging path to a first detector and a second portion of the illumination along a second imaging path to a second detector. A first wave front coder and a second wave front coder may be respectively disposed along the first imaging path and the second imaging path. The first wave front coder and the second wave front coder may be configured to induce one or more imaging effects, at least by respectively phase shifting the first portion of the illumination directed along the first imaging path and the second portion of the illumination directed along the second imaging path. The system may further include at least one computing system communicatively coupled to the first detector and the second detector. The at least one computing system may be configured to acquire a first image from the first detector and a second image from the second detector. The computing system may be further configured to filter the first image and the second image to remove at least a portion of the one or more imaging effects induced by the first wave front coder and the second wave front coder.

In yet another aspect, the present disclosure is directed to a method of stereoscopically imaging at least a portion of one or more samples. The method may include: illuminating at least a portion of a sample; directing illumination transmitted through or reflected from a surface of the sample along a collection path; directing a first portion of the illumination from the collection path along a first imaging path to a first detector and a second portion of the illumination from the collection path along a second imaging path to a second detector; inducing one or more imaging effects utilizing one or more wave front coders to at least phase shift the illumination directed along the collection path or to at least respectively phase shift the first portion of the illumination directed along the first imaging path and the second portion of the illumination directed along the second imaging path; acquiring a first image from the first detector and a second image from the second detector; and filtering the first image and the second image to remove at least a portion of the one or more imaging effects induced by the one or more wave front coders.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1A:
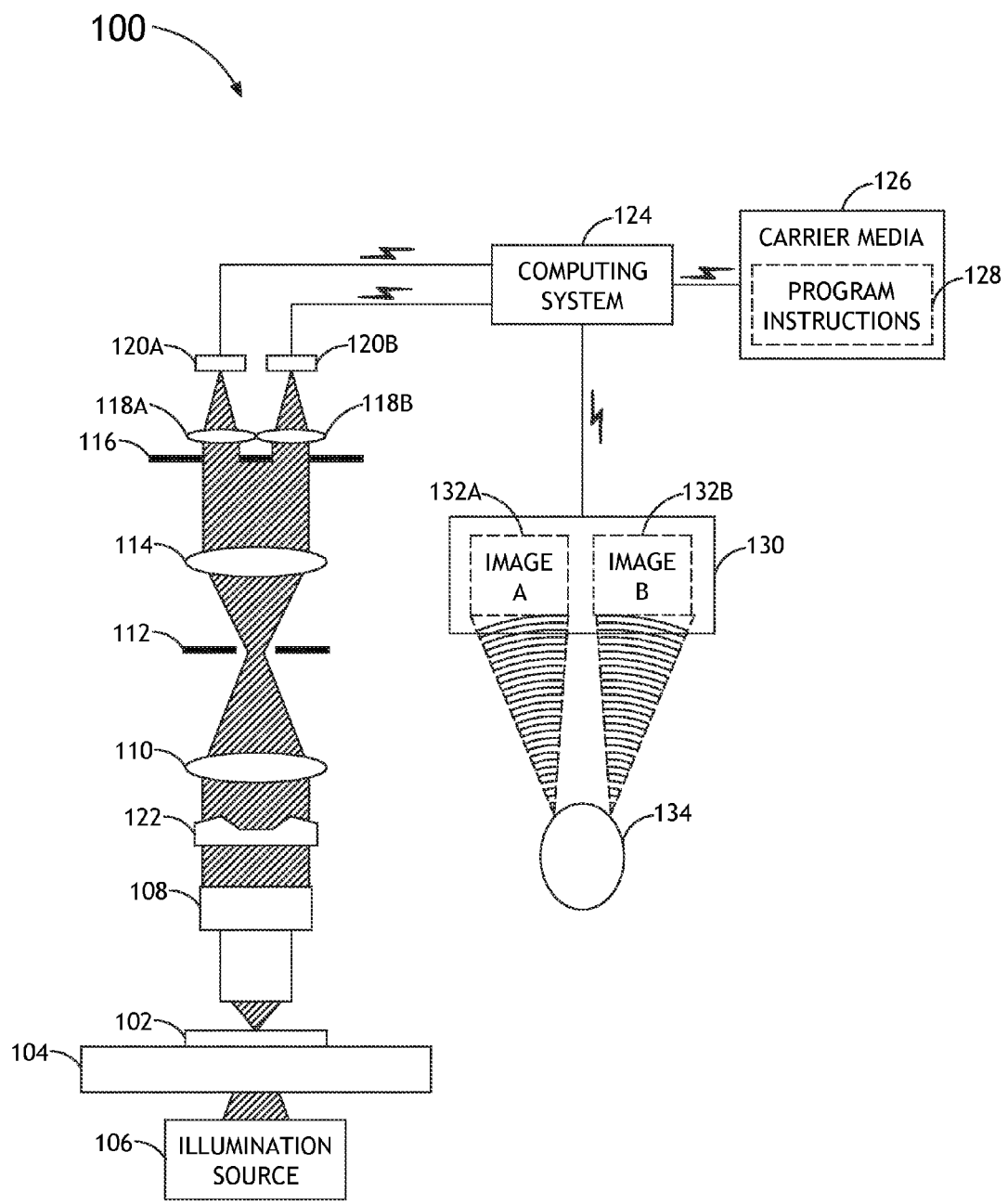
FIG. 1A is a block diagram illustrating a system for stereoscopically imaging at least a portion of one or more samples, in accordance with an embodiment of this disclosure.
Figure 1B:
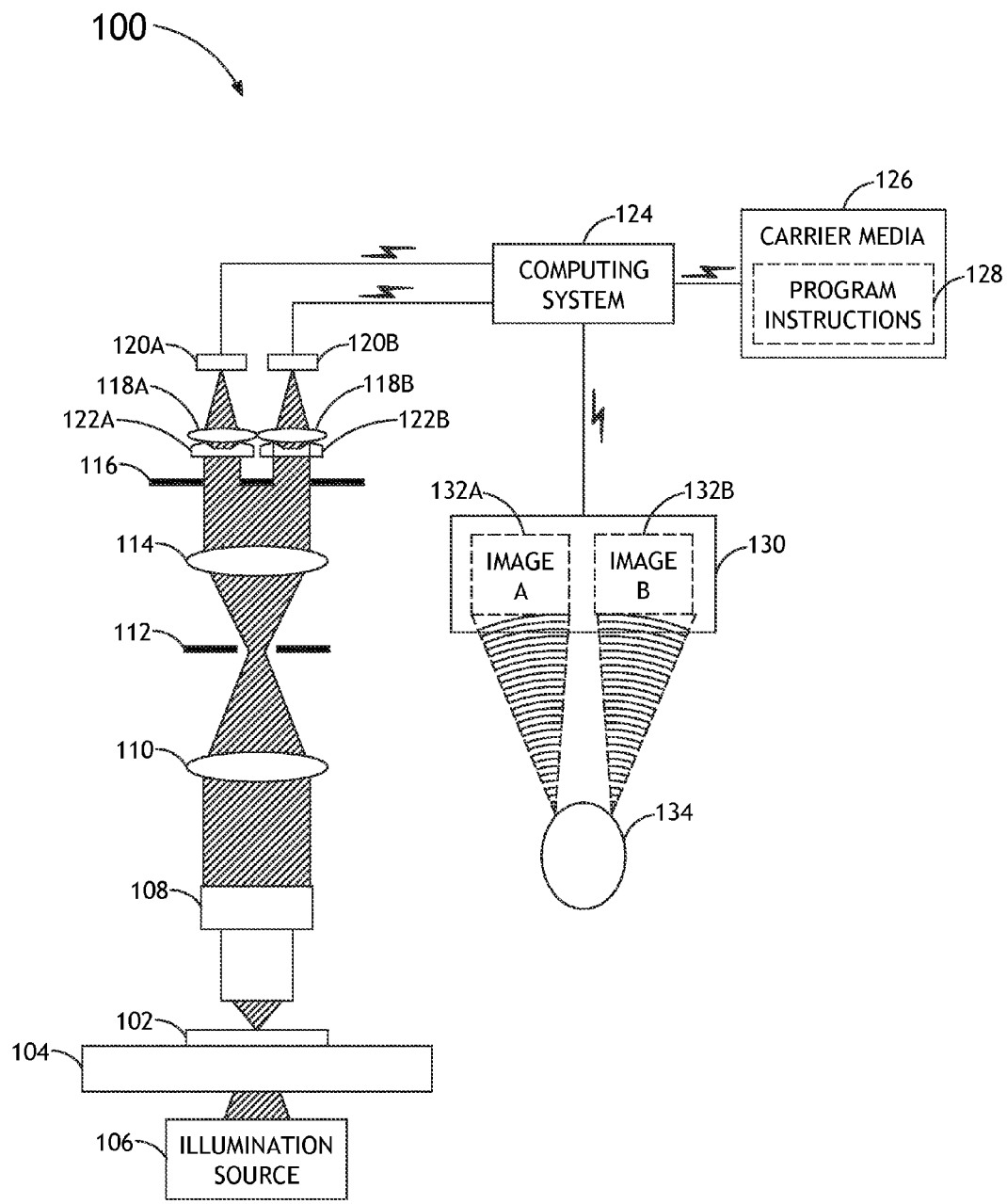
FIG. 1B is a block diagram illustrating a system for stereoscopically imaging at least a portion of one or more samples, wherein two parallel wave front coders are disposed along respective imaging paths of a first detector and a second detector, in accordance with an embodiment of this disclosure.
Figure 2:
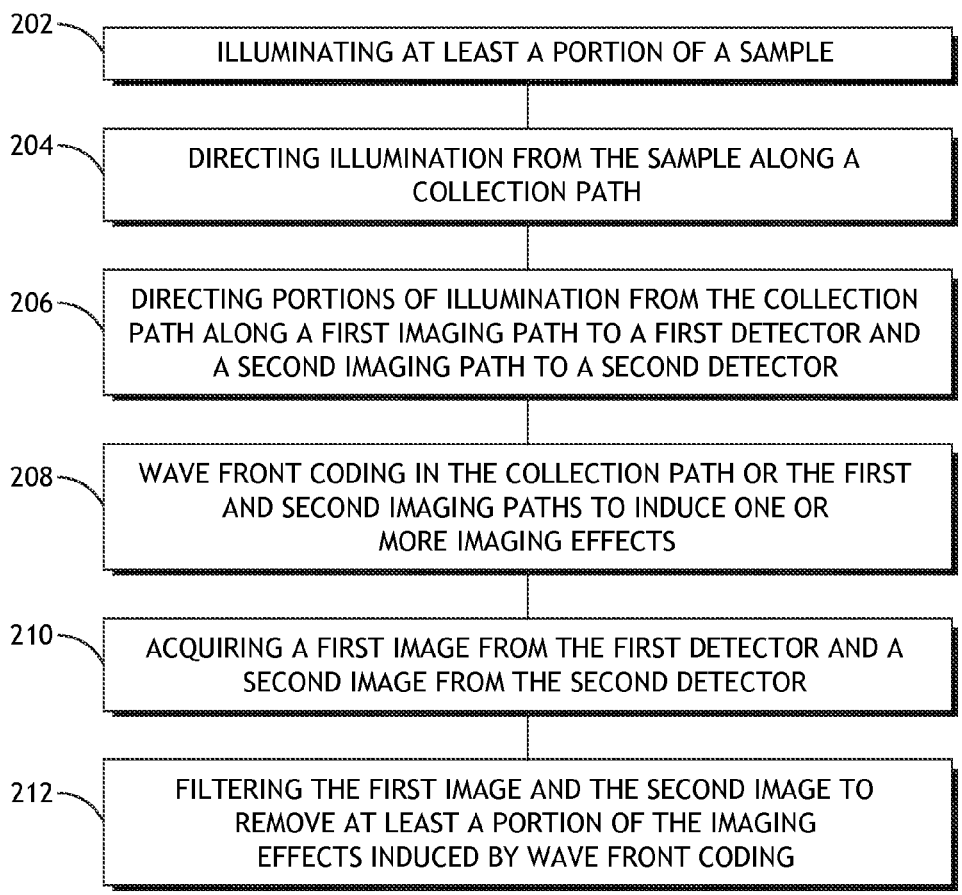
FIG. 2 is a flow diagram illustrating a method of stereoscopically imaging at least a portion of one or more samples, in accordance with an embodiment of this disclosure.

FIGS. 1A through 2 generally illustrate a system and method for stereoscopically imaging at least a portion of one or more samples. In various embodiments of the disclosure, wave front coding is applied along a first image train going to a first image detector and along a second image train going to a second image detector to enhance depth of focus. The resulting images may be decoded to restore image resolution while maintaining at least a portion of the extended depth of focus gained by wave front coding. As used herein, the terms "wave front coding" and "wave front coder" generally refer to apparatuses, systems, and/or methods of selectively producing imaging effects to enhance depth of focus, more thoroughly described in U.S. Pat. No. 7,218,448. U.S. Pat. No. 7,218,448 is incorporated herein by reference.

As used herein, the term "sample" generally refers to any organic or inorganic specimen, such as a tissue sample, a three dimensional (3D) cell stack, a specimen disposed on a microscopy slide, and the like. It is contemplated that the advantages of the present disclosure may be appreciated in a variety of contexts, especially when samples of interest have complex or deep structural attributes. As such, the embodiments herein are provided for illustrative purposes and are not intended to limit the present disclosure in any way.

FIG. 1A illustrates a system 100 for stereoscopically imaging at least a portion of a sample 102, in accordance with an embodiment of the disclosure. The system 100 may include a stage 104 configured to receive and support the sample 102 for imaging. The system 100 may further include at least one illumination source 106 configured to illuminate at least a portion of the sample 102. Illumination emanating from the illumination source 106 may be reflected from and/or transmitted through a portion of a surface of the sample 102. In some embodiments, illumination is reflected from or transmitted through a portion of the sample surface including the imaged portion of the sample 102.

The system 100 may further include collection optics configured to receive at least a portion of illumination reflected and/or transmitted from the imaged portion of the surface of the sample 102. The collection optics may include any combination of optical elements defining one or more collection paths. In one embodiment, the collection optics may include an objective lens 108 configured to receive illumination from the imaged portion of the sample 102. The objective lens 108 may be further configured to focus and magnify the received illumination. In some embodiments, the system 100 may include a plurality of selectable objective lenses 108, each having an associated level of magnification. The collection optics may further include a combination of optical elements for directing, focusing, filtering, polarizing, attenuating, and/or selectively modifying illumination directed along the collection path. For example, the collection optics may include, but are not limited to, a tube lens 110, a field stop 112, and a pupil imaging lens 114 further defining the collection path.

In some embodiments, the collection optics may be configured to direct illumination from the sample 102 along a common collection path. The collection optics may further include an illumination splitting element 116, such as a substrate including pinholes or pupil apertures, configured to direct a first portion of the illumination is along a first imaging path to a first detector 120A and a second portion of the illumination along a second imaging path to a second detector 120B. Each of the respective imaging paths may further include one or more optical elements, such as an imaging lens 118A, 118B configured to focus the respective portion of illumination received by each detector 120A, 120B. In another embodiment, separate collection/imaging paths may be respectively associated with each of the first detector 120A and the second detector 120B.

The detectors 120 may include digital cameras (e.g. CCD or CMOS cameras) or any other image detectors known to the art. Each detector 120 may have a respective image train defined by optical elements arranged in at least one collection path and a respective imaging path. A first image train directing the first portion of illumination to the first detector 120A and a second image train directing the second portion of illumination to the second detector 120B may be angularly offset from each other. Accordingly, the detectors 120 may be configured to detect two different perspectives of the imaged portion of the sample 102.

The system 100 may further include at least one wave front coder 122 configured to induce one or more imaging effects by modifying at least one characteristic of illumination received by the detectors 120. In some embodiments, the wave front coder 122 includes a phase shifting element, such as an aspheric phase plate, configured to phase shift illumination. In some embodiments, the wave front coder 122 may be disposed along a common collection path, as illustrated in FIG. 1A. Alternatively, two wave front coders 122 may be configured to modify portions of illumination directed along parallel imaging or collection paths. For example (see FIG. 1B), a first wave front coder 122A may be disposed along the first imaging path leading to the first detector 120A and a second wave front coder 122B may be disposed along the second imaging path leading to the second detector 120B.

The system 100 may further include at least one computing system 124 communicatively coupled to the detectors 120. The computing system 124 may include at least one processor configured to execute program instructions 128 from carrier media 126 to perform any of the image acquisition and/or image processing steps described herein. The computing system 124 may be further configured to accept commands and convey information via one or more user interface devices (e.g. keyboard, mouse, LCD/LED display, touch pad, touch screen), many of which are known to the art.

The computing system 124 may be configured to receive at least one intermediate set including a first image and a second image from the respective first and second detectors 120A and 120B. The intermediate set may include one or more imaging effects induced by the one or more wave front coders 122. In one embodiment, each of the intermediate (i.e. wave front coded) images may be non-uniformly blurred along a selected axis (e.g. Z-axis) in such a way that the resulting image appears blurred uniformly for all positions along the selected axis (e.g. all z positions). The intermediate images may additionally exhibit an enhanced depth of focus as a result of the wave front coding. The computing system 124 may be configured to digitally filter (i.e. decode) the intermediate set of images to generate a filtered set of images including at least a first image 132A and a second image 132B with at least a portion of the imaging effects removed. For example, the computing system 124 may be configured to sharpen the intermediate images to restore image resolution by removing at least a portion of the blurring effects from wave front coding. However, the computing system 124 may be configured to substantially restore image resolution without significantly altering the enhanced depth of focus effects. As a result, the filtered images 132 may exhibit image resolution above a selected level in addition to an extended depth of focus (e.g. at least 2 to 10 times more depth than would be expected).

In some embodiments, the system 100 may further include a stereoscopic display 130 configured to independently display the first and second filtered images 132A and 132B substantially simultaneously to respective first and second eyes of an observer 134. For further example, the first image 132A may be viewed independently by the first eye of the observer 134 while the second image 1326 is being viewed independently by the second eye of the observer 134. Stereoscopy is known to the art for creating an illusion of enhanced depth (i.e. 3D perception). As such, depth of focus may be greatly improved by stereoscopically imaging at least a portion of the sample 102 in addition wave front coding/decoding in the respective image trains of the first and second detectors 120.

In some embodiments, the stereoscopic display 130 may be communicatively coupled to the computing system 124 via direct wired/wireless link or within a network (e.g. LAN or WAN). Alternatively, one or more sets of first and second image pairs 132A and 132B may be recorded and transferred to the display from a portable carrier medium such as a CD, DVD, BLUERAY disc, flash drive, external hard drive, and the like. Many stereoscopic displays 130 are known to the art including, but not limited to, binocular vision (as found in stereo microscopes), passive stereoscopic displays (e.g. polarized or anaglyph 3D systems), active stereoscopic displays (e.g. active shutter 3D systems), and autostereoscopic displays (e.g. parallax barrier systems).

FIG. 2 is a flow diagram illustrating a method 200 of stereoscopically imaging at least a portion of one or more samples 102. System 100 is a manifestation of method 200; accordingly, all steps or features described with regard to system 100 or method 200 are applicable to both unless otherwise noted. However, it is contemplated that one or more steps of method 200 may be executed via various means known to the art including, but not limited to, stereoscopy systems having alternative arrangements, number of channels, and/or other parameters differing from embodiments of system 100 described herein. Therefore, the foregoing embodiments of system 100 should not be interpreted to limit method 200 in any way.

At step 202, at least a portion of the sample 102 is illuminated including an imaged portion of the sample 102. Illumination may be reflected from or transmitted through the imaged portion of the sample 102. At steps 204 and 206, the reflected or transmitted illumination is directed along at least one collection path. A first portion of the illumination is then directed along a first imaging path to a first detector 120A and a second portion of the illumination is directed along a second imaging path to a second detector 120B. In some embodiments, a common collection path diverges into separate paths leading the first detector 120A and the second detector 120B. Alternatively, separate paths (i.e. collection/imaging paths) direct first and second portions of the illumination reflected or transmitted from the imaged portion of the sample 102 to the respective first and second detectors 120.

At step 208, the illumination directed along the collection path or the first and second portions of illumination directed along the first and second imaging paths are wave front coded. In either case, the first detector 120A receives a first wave front coded portion of illumination via a first image train and the second detector 120B receives a second wave front coded portion of illumination via the second image train. Wave front coding includes altering one or more properties of the illumination to produce one or more imaging effects (e.g. enhanced depth of focus). In some embodiments, wave front coding includes phase shifting the illumination utilizing a phase shifting element, such as an aspheric phase plate.

At step 210, an intermediate (i.e. wave front coded) set of first and second images may be received from the respective first and second detectors 120. The intermediate images may exhibit one or more imaging effects from wave front coding. At step 212, the intermediate images may be filtered (i.e. decoded) to remove at least a portion of the wave front coding imaging effects. For example, the intermediate images may be filtered to remove at least a portion of a blurring effect by digitally sharpening the image. However, the filtered images 132 may continue to exhibit selected imaging effects, such as enhanced depth of focus. Accordingly, the filtered images 132 may advantageously exhibit high resolution and an extended depth of focus. Furthermore, a stereoscopic display 130 may allow an observer 134 to view the first filtered image 132A in a first eye of the observer 134 substantially simultaneous to viewing the second filtered image 132B in a second eye of the observer 134 with substantially no overlap, thereby further creating an illusion of enhanced depth (i.e. 3D perception).

It is contemplated that each of the embodiments of the method described above may include any other step(s) of any other method(s) described herein. In addition, each of the embodiments of the method described above may be performed by any of the systems described herein.

It should be recognized that the various steps described throughout the present disclosure may be carried out by a single computing system or by multiple computing systems. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A system for stereoscopically imaging at least a portion of one or more samples, comprising:
   a stage configured to support a sample;
   an illumination source configured to illuminate at least a portion of the sample, wherein the illumination source is configured to backlight at least a portion of the sample whereby illumination is transmitted through at least a portion of the sample;
   collection optics defining a collection path, the collection optics configured to receive illumination transmitted through the sample, the collection optics including a substrate, the substrate including two or more apertures positioned in the same plane and arranged to direct a first portion of the illumination along a first imaging path to a first detector and a second portion of the illumination along a second imaging path parallel to the first path to a second detector;
   a wave front coder disposed along the collection path, the wave front coder configured to induce one or more imaging effects on the received illumination, transmitted through at least a portion of the sample, prior to entry of the received illumination along at least one of the first imaging path or the second imaging path at least by phase shifting the illumination directed along the collection path, wherein the wave front coder, collection optics, illumination source and stage are arranged in a columnar structure; and
   at least one computing system communicatively coupled to the first detector and the second detector, the at least one computing system configured to acquire a first image from the first detector and a second image from the second detector, and further configured to filter the first image and the second image to remove at least a portion of the one or more imaging effects induced by the wave front coder.

2. The system of claim 1, further comprising:
   at least one stereoscopic display configured to substantially simultaneously display the first filtered image and the second filtered image to generate an optical illusion of perceiving a three dimensional image.

3. The system of claim 1, wherein the wave front coder includes an aspheric phase plate.

4. The system of claim 1, wherein the one or more imaging effects include blurring the first image and the second image non-uniformly along a selected axis.

5. The system of claim 4, wherein the one or more imaging effects cause the first image and the second image to appear uniformly blurred for substantially all positions along the selected axis.

6. The system of claim 1, wherein the first detector includes a first digital camera, and wherein the second detector includes a second digital camera.

7. The system of claim 1, wherein the at least one computing system is configured to filter the first image and the second image to remove at least a blurring imaging effect without substantially affecting an extended depth of focus imaging effect.

8. A system for stereoscopically imaging at least a portion of one or more samples, comprising:
   a stage configured to support a sample;
   an illumination source configured to illuminate at least a portion of the sample, wherein the illumination source is configured to backlight at least a portion of the sample whereby illumination is transmitted through at least a portion of the sample;
   collection optics defining a collection path, the collection optics configured to receive illumination transmitted through the sample, the collection optics including a substrate, the substrate including two or more apertures positioned in the same plane and arranged to direct a first portion of the illumination along a first imaging path to a first detector and a second portion of the illumination along a second imaging path parallel to the first path to a second detector;
   a first wave front coder and a second wave front coder respectively disposed along the first imaging path and the second imaging path, the first wave front coder and the second wave front coder configured to induce one or more imaging effects, on illumination transmitted through at least a portion of the sample, at least by respectively phase shifting the first portion of the illumination directed along the first imaging path and the second portion of the illumination directed along the second imaging path, wherein the first wave front coder, second wave front coder, collection optics, illumination source and stage are arranged in a columnar structure; and
   at least one computing system communicatively coupled to the first detector and the second detector, the at least one computing system configured to acquire a first image from the first detector and a second image from the second detector, and further configured to filter the first image and the second image to remove at least a portion of the one or more imaging effects induced by the first wave front coder and the second wave front coder.

9. The system of claim 8, further comprising:
   at least one stereoscopic display configured to substantially simultaneously display the first filtered image and the second filtered image to generate an optical illusion of perceiving a three dimensional image.

10. The system of claim 8, wherein the first wave front coder includes a first aspheric phase plate, and wherein the second wave front coder includes a second aspheric phase plate.

11. The system of claim 8, wherein the one or more imaging effects include blurring the first image and the second image non-uniformly along a selected axis.

12. The system of claim 11, wherein the one or more imaging effects cause the first image and the second image to appear uniformly blurred for substantially all positions along the selected axis.

13. The system of claim 8, wherein the first detector includes a first digital camera, and wherein the second detector includes a second digital camera.

14. The system of claim 8, wherein the at least one computing system is configured to filter the first image and the second image to remove at least a blurring imaging effect without substantially affecting an extended depth of focus imaging effect.

15. A method of stereoscopically imaging at least a portion of one or more samples, comprising:
   illuminating at least a portion of a sample with an illumination source, wherein the illumination source is configured to backlight at least a portion of the sample whereby illumination is transmitted through at least a portion of the sample;
   directing illumination transmitted through the sample along a collection path;
   directing, with two or more apertures formed in a substrate disposed within the collection path and positioned in the same plane, a first portion of the illumination from the collection path along a first imaging path to a first detector and a second portion of the illumination from the collection path along a second imaging path to a second detector;
   inducing one or more imaging effects, on illumination transmitted through at least a portion of the sample, utilizing one or more wave front coders to at least phase shift the illumination directed along the collection path or to at least respectively phase shift the first portion of the illumination directed along the first imaging path and the second portion of the illumination directed along the second imaging path, wherein the one or more wavefront coders, two or more apertures, illumination source and stage are arranged in a columnar structure;
   acquiring a first image from the first detector and a second image from the second detector; and
   filtering the first image and the second image to remove at least a portion of the one or more imaging effects induced by the one or more wave front coders.

16. The method of claim 15, further including:
   displaying the first filtered image and the second filtered image substantially simultaneously to generate an optical illusion of perceiving a three dimensional image.

17. The method of claim 15, wherein inducing one or more imaging effects utilizing one or more wave front coders includes:
   phase shifting the illumination directed along the collection path.

18. The method of claim 15, wherein inducing one or more imaging effects utilizing one or more wave front coders includes:
   phase shifting the first portion of the illumination directed along the first imaging path utilizing a first wave front coder; and
   phase shifting the second portion of the illumination directed along the second imaging path utilizing a second wave front coder.

19. The method of claim 15, wherein inducing one or more imaging effects includes:
   blurring the first image and the second image non-uniformly along a selected axis.

20. The method of claim 19, wherein the one or more imaging effects cause the first image and the second image to appear uniformly blurred for substantially all positions along the selected axis.

21. The method of claim 15, wherein the first image and the second image are filtered to remove at least a blurring imaging effect without substantially affecting an extended depth of focus imaging effect.

* * * * *